United States Patent

Inoue

(10) Patent No.: US 11,698,252 B2
(45) Date of Patent: Jul. 11, 2023

(54) ERROR DETERMINATION APPARATUS, ERROR DETERMINATION METHOD, AND STORAGE MEDIUM

(71) Applicant: MITUTOYO CORPORATION, Kanagawa (JP)

(72) Inventor: Yuto Inoue, Ibaraki (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 17/468,830

(22) Filed: Sep. 8, 2021

(65) Prior Publication Data

US 2022/0107177 A1 Apr. 7, 2022

(30) Foreign Application Priority Data

Oct. 2, 2020 (JP) ................. 2020-167729

(51) Int. Cl.
G01B 21/04 (2006.01)

(52) U.S. Cl.
CPC .......... *G01B 21/045* (2013.01); *G01B 21/047* (2013.01)

(58) Field of Classification Search
CPC .................... G01B 21/045; G01B 21/047
USPC ........................................ 702/108
See application file for complete search history.

(56) References Cited

U.S. PATENT DOCUMENTS

| 10,073,435 B2* | 9/2018 | Sagemueller ........ G05B 19/402 |
| 2015/0233692 A1 | 8/2015 | Nakagawa et al. |
| 2016/0018218 A1* | 1/2016 | Nakagawa ............. G01B 5/008 33/503 |
| 2021/0387301 A1* | 12/2021 | O'Hare ................ G01B 11/005 |

FOREIGN PATENT DOCUMENTS

JP 2015-152576 8/2015

* cited by examiner

*Primary Examiner* — Aditya S Bhat
(74) *Attorney, Agent, or Firm* — Greenblum & Bernstein, P.L.C.

(57) ABSTRACT

An error determination apparatus for determining a measurement error that occurs when a workpiece is measured by a coordinate measuring machine, the error determination apparatus includes an information acquisition part that acquires a) motion error information indicating a result of measuring a motion error of the coordinate measuring machine and b) design information of the workpiece, a measurement position specification part that specifies a measurement position on the workpiece on the basis of the design information, an error determination part that determines a measurement error occurring in the measurement at the measurement position due to the motion error on the basis of the motion error information, and an output part that outputs the measurement error determined by the error determination part.

8 Claims, 4 Drawing Sheets

ERROR DETERMINATION APPARATUS, ERROR DETERMINATION METHOD, AND STORAGE MEDIUM

CROSS-REFERENCE TO RELATED APPLICATIONS

The present application claims priority to Japanese Patent Applications number 2020-167729, filed on Oct. 2, 2020. The contents of this application are incorporated herein by reference in their entirety.

BACKGROUND OF THE DISCLOSURE

Techniques for calculating a motion error generated by a coordinate measuring machine are known (for example, see Japanese Unexamined Patent Application Publication No. 2015-152576).

A user of a coordinate measuring machine sometimes estimates a motion error of the coordinate measuring machine and checks the coordinate measuring machine using the estimated motion error as an indicator. However, the motion error differs from a measurement error that occurs when a workpiece is measured. Therefore, there is a problem that determining the quality of the coordinate measuring machine on the basis of the motion error does not always lead to an appropriate determination.

BRIEF SUMMARY OF THE DISCLOSURE

The present disclosure focuses on these points, and an object of the present disclosure is to improve the accuracy of determining the reliability of a coordinate measuring machine.

An error determination apparatus according to the first aspect of the present disclosure is an error determination apparatus for determining a measurement error that occurs when a workpiece is measured by a coordinate measuring machine, the error determination apparatus includes an information acquisition part that acquires a) motion error information indicating a result of measuring a motion error of the coordinate measuring machine and b) design information of the workpiece, a measurement position specification part that specifies a measurement position on the workpiece on the basis of the design information, an error determination part that determines a measurement error occurring in the measurement at the measurement position due to the motion error on the basis of the motion error information, and an output part that outputs the measurement error determined by the error determination part.

An error determination method according to the second aspect of the present disclosure is an error determination method of determining a measurement error that occurs when a workpiece is measured by a coordinate measuring machine, performed by a computer, the method includes the steps of acquiring a) motion error information indicating a result of measuring a motion error of the coordinate measuring machine and b) design information of the workpiece, determining a measurement position on the workpiece on the basis of the design information, determining a measurement error occurring in the measurement at the measurement position due to the motion error on the basis of the motion error information, and outputting the determined measurement error.

A non-transitory recording medium storing a program according to the third aspect of the present disclosure stores a program for causing a computer to determine a measurement error that occurs when a workpiece is measured by a coordinate measuring machine, the program causing the computer to implement functions including acquiring a) motion error information indicating a result of measuring a motion error in the coordinate measuring machine and b) design information of the workpiece, determining a measurement position on the workpiece on the basis of the design information, determining a measurement error occurring in the measurement at the measurement position due to the motion error on the basis of the motion error information, and outputting the determined measurement error.

DETAILED DESCRIPTION OF THE DISCLOSURE

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

<An Outline of an Error Determination Method According to the Present Embodiment>

Figure 1:
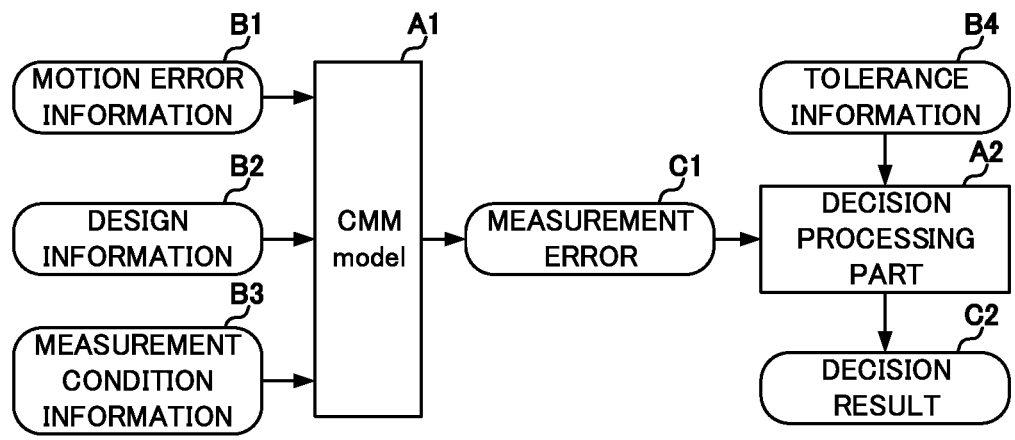
FIG. 1 is a diagram for explaining an outline of an error determination method according to the present embodiment.

FIG. 1 is a diagram for explaining an outline of an error determination method according to the present embodiment. Referring to FIG. 1, an outline of a) a method for determining a measurement error that occurs when a workpiece is measured by a coordinate measuring machine using an error determination apparatus 10 and b) a method for determining the presence or absence of an abnormality in the coordinate measuring machine on the basis of the determined measurement error is described.

A CMM model A1 is a model that outputs a measurement error of a coordinate measuring machine when various conditions for measuring a workpiece with the coordinate measuring machine are inputted. When a computer executes a program, it functions as the CMM model A1 that outputs the measurement error on the basis of the inputted information. On the basis of motion error information B1, design information B2, and measurement condition information B3 inputted, the CMM model A1 outputs the measurement error that occurs when the coordinate measuring machine performs measurement corresponding to these pieces of information.

The motion error information B1 is information indicating a result of measuring the motion error of the coordinate measuring machine (that is, a coordinate measuring machine as a target whose measurement error is to be determined) corresponding to the CMM model A1. The motion error includes a) a translational error such as a scale error or a squareness error and b) a rotational error, for example. The motion error information B1 includes a value of the motion error determined on the basis of a result of a daily inspection of the coordinate measuring machine, for example.

The design information B2 is design information of the workpiece. The design information is information for specifying geometry, length, thickness, and the like of the workpiece, and is Computer Aided Design (CAD) data of the workpiece, for example.

The measurement condition information B3 is information indicating a measurement condition when the coordinate measuring machine corresponding to the CMM model A1 measures the workpiece. The measurement condition includes, for example, a construction of the coordinate measuring machine, properties of a probe provided to the coordinate measuring machine, a location of the workpiece, an orientation of the workpiece during measurement, and a measurement point on the workpiece.

A measurement error C1 is a measurement error that occurs due to the motion error and the measurement condition when the coordinate measuring machine corresponding to the CMM model A1 measures the workpiece. The measurement error C1 is a measurement error that occurs when the workpiece is measured under a condition indicated by the measurement condition information B3.

In the error determination method shown in FIG. 1, after the measurement error C1 is determined, a decision processing part A2 compares the measurement error C1 to a tolerance indicated by tolerance information B4 of the workpiece, to decide whether the coordinate measuring machine is normal. For example, if the measurement error C1 is larger than the tolerance, the error determination apparatus 10 outputs a decision result C2 that there is an abnormality in the coordinate measuring machine. By using such an error determination apparatus 10 to improve the accuracy of determining the reliability of the coordinate measuring machine, it is possible to ascertain before measurement whether a reliable measurement result can be obtained when the coordinate measuring machine measures the geometry of the workpiece that needs to be measured.

Figure 2A:
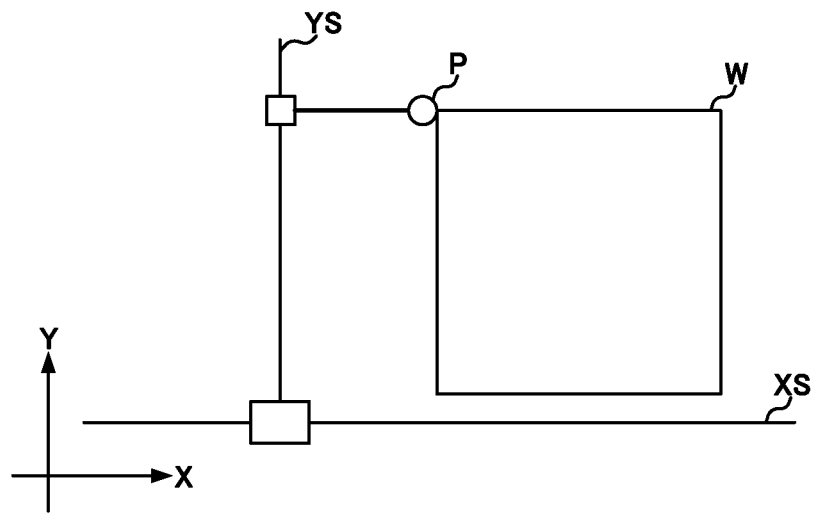
FIGS. 2A and 2B are diagrams for explaining an exemplary measurement error C1 determined by an error determination apparatus 10.
Figure 2B:
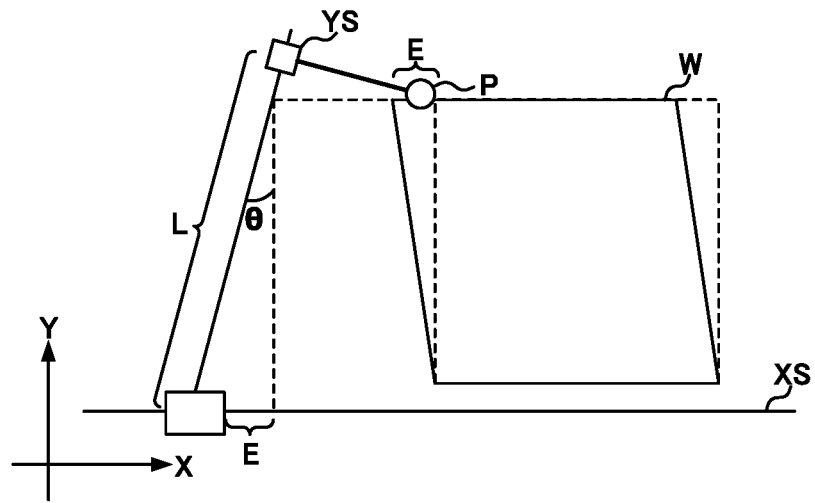

FIGS. 2A and 2B are diagrams for explaining an exemplary measurement error C1 determined by the error determination apparatus 10. FIG. 2A shows measurement of the workpiece with no motion error occurring. FIG. 2B shows measurement of the workpiece when a motion error occurs due to yawing in a Y-direction. It should be noted that, for simplicity of explanation, FIGS. 2A and 2B show examples of measuring a square workpiece W using a coordinate measuring machine including an X-stage XS, a Y-stage YS, and a probe P.

As shown in FIG. 2A, in measuring the workpiece W with no motion error, there is no need to consider the motion error when estimating the measurement error in measuring the workpiece W with the coordinate measuring machine. However, as shown in FIG. 2B, if an XY squareness changes due to yawing in the Y-direction, for example, the measurement of the workpiece W will contain the motion error that can be specified on the basis of a product of a length L and a rotation error θ. The CMM model A1 is used for determining the measurement error C1 as a product of the length L and the rotation error θ. The product corresponds to the motion error at a position where the probe P and the workpiece W contact each other.

<A Configuration of the Error Determination Apparatus 10>

Figure 3:
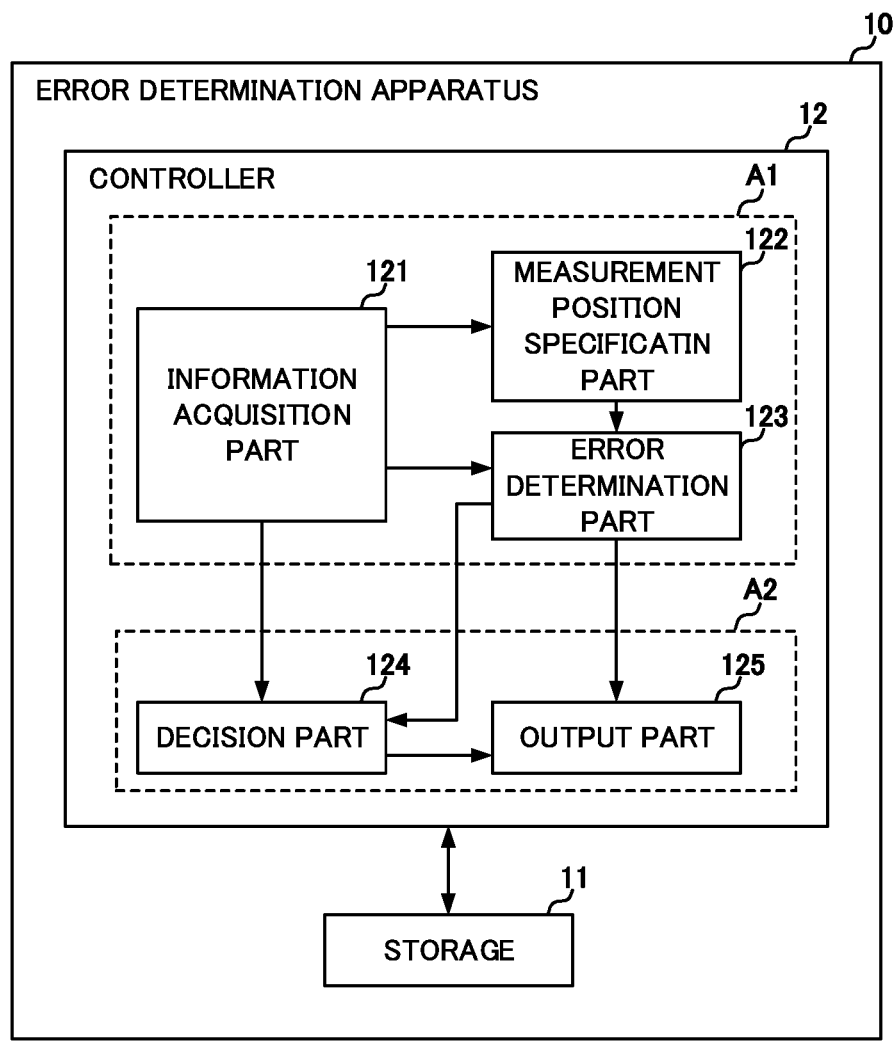
FIG. 3 is a diagram for explaining a configuration of the error determination apparatus 10.

FIG. 3 is a diagram for explaining a configuration of the error determination apparatus 10. The error determination apparatus 10 includes a storage 11 and a controller 12. The storage 11 includes a storage medium such as a Read Only Memory (ROM), a Random Access Memory (RAM), a hard disk, and the like. The storage 11 stores a program to be executed by the controller 12.

The controller 12 is a CPU (Central Processing Unit), for example. The controller 12 functions as an information acquisition part 121, a measurement position specification part 122, an error determination part 123, a decision part 124, and an output part 125, by executing the program stored in the storage 11. The controller 12 functions as the CMM model A1 shown in FIG. 1, with the information acquisition part 121, the measurement position specification part 122, and the error determination part 123 working together. The decision part 124 and the output part 125 function as the decision processing part A2 shown in FIG. 1.

The information acquisition part 121 acquires information required for determining the measurement error C1 and outputting the decision result C2. The information acquisition part 121 acquires the information through a communication network such as a LAN (Local Area Network).

The information acquisition part 121 acquires the motion error information B1, which indicates the result of measuring the motion error of the coordinate measuring machine, from a computer (not shown in figures) that stores the result of the daily inspection of the coordinate measuring machine, for example. The information acquisition part 121 acquires the design information B2 of the workpiece from a computer (not shown in figures) that stores CAD data of the workpiece, for example. The information acquisition part 121 outputs the motion error information B1 to the error determination part 123, and outputs the design information B2 to the measurement position specification part 122.

The information acquisition part 121 further acquires, for example, the measurement condition information B3, indicating a plurality of measurement conditions when the coordinate measuring machine measures the workpiece, from a computer (not shown in figures) of a person who measures the workpiece. The measurement condition information B3 includes a) characteristic information indicating characteristics of the probe that contacts the workpiece and b) position information indicating a location of the workpiece in the coordinate measuring machine. The characteristics of the probe include a size, length, orientation, and configuration of a stylus provided to the probe, for example. The information acquisition part 121 outputs the measurement condition information B3 to the error determination part 123.

The information acquisition part 121 further acquires the tolerance information B4 indicating the tolerance of the workpiece from the computer storing the CAD data of the workpiece, for example. The tolerance indicated by the tolerance information B4 includes geometric tolerances for straightness, flatness, parallelism, squareness, and the like of the workpiece, for example. The information acquisition part 121 outputs the tolerance information B4 to the decision part 124.

It should be noted that the computer storing the result of the daily inspection of the coordinate measuring machine, the computer storing the CAD data of the workpiece, and the computer of the person who measures the workpiece may be the same computer, or may be different computers.

The measurement position specification part 122 specifies the measurement position on the workpiece on the basis of the design information B2 acquired by the information acquisition part 121. The measurement position is a position of a feature point of the workpiece, such as a vertex, for example. The measurement position on the workpiece is represented by the direction and distance to the reference position of the workpiece, for example. The measurement position specification part 122 may specify the measurement position on the basis of the measurement point indicated by the measurement condition information B3 with the design information B2. The measurement position specification part 122 notifies the error determination part 123 about the specified measurement position on the workpiece.

On the basis of the motion error information B1, the error determination part 123 determines the measurement error C1 that occurs in a measurement at the measurement position due to the motion error. For example, on the basis of the motion error information B1 obtained by the information acquisition part 121, the error determination part 123 determines the measurement error C1, such as a translation error or a rotation error that occurs at each of the plurality of measurement positions specified by the measurement position specification part 122.

Motion errors that occur in the coordinate measuring machine are different depending on the measurement position because the distance and direction in which the probe moves changes depending on the measurement position, for example. The error determination part 123 specifies the distance and direction in which the probe moves on the basis of the measurement position, and determines the motion error corresponding to the specified direction and distance, thereby determining the measurement error C1 with high calculation accuracy.

The error determination part 123 determines the measurement error C1 further on the basis of one or more measurement conditions that affect the measurement at the measurement position among the plurality of measurement conditions indicated by the measurement condition information B3. For example, when the measurement condition information B3 includes the characteristic information indicating the characteristics of the probe that contacts the workpiece, the error determination part 123 determines the measurement error C1 that occurs when the probe contacts the measurement position on the basis of the characteristics of the probe.

Motion errors that occur in the coordinate measuring machine are different depending on the position of the stylus in contact with the workpiece, for example. By specifying the position of the stylus in contact with the workpiece at the measurement position on the basis of the characteristic information of the probe, the error determination part 123 determines the measurement error C1 at the measurement position by taking into account the position of the stylus where the stylus contacts the workpiece.

When the measurement condition information B3 includes the position information indicating the location of the workpiece in the coordinate measuring machine, the error determination part 123 may determine the measurement error on the basis of the motion error corresponding to the location indicated by the position information. The location is represented by coordinates in the Cartesian coordinate system of a space that can be measured by the coordinate measuring machine. The error determination part 123 specifies the measurement position in the Cartesian coordinate system of the space that can be measured by the coordinate measuring machine, on the basis of the measurement position specified by the measurement position specification part 122 and the location indicated by the position information.

Subsequently, the error determination part 123 specifies the distance and direction in which the probe moves on the basis of the specified measurement position. The error determination part 123 determines the measurement error C1 at each of the plurality of measurement positions on the basis of the length and the like of the probe at each of the plurality of measurement positions specified on the basis of the distance and direction in which the probe moves. The error determination part 123 can determine the measurement error C1 at the measurement position by measuring the measurement error on the basis of the motion error corresponding to the location of the workpiece in this way.

The decision part 124 compares the measurement error C1 determined by the error determination part 123 to the tolerance of the workpiece indicated by the tolerance information B4 acquired by the information acquisition part 121, and decides whether the measurement error C1 is within an acceptable range on the basis of a result of the comparing. The decision part 124 compares each of the plurality of motion errors included in the measurement error C1 with the tolerances of the workpiece respectively corresponding to the motion errors.

Specifically, the decision part 124 decides that the measurement error C1 is not within the acceptable range if one or more of the plurality of motion errors included in the measurement error C1 exceeds the tolerances of the workpiece respectively corresponding to the one or more motion errors. On the other hand, if each of the plurality of motion errors included in the measurement error C1 is less than or equal to the tolerances of the workpiece respectively corresponding to the plurality of motion errors, the decision part 124 decides that the measurement error C1 is within the acceptable range. The decision part 124 notifies the output part 125 of the decision result.

The output part 125 outputs the measurement error C1 determined by the error determination part 123. In this case, the output part 125 outputs the measurement error C1 associated with each of the plurality of measurement positions on the workpiece. The output part 125 outputs the result of comparing the tolerance indicated by the tolerance information B4 and the measurement error C1. The result of comparing is a result of the decision of the decision part 124 concerning whether or not the measurement error C1 is within the acceptable range, and corresponds to the decision result C2.

The output part 125 outputs the measurement error C1 and the decision result C2 to an information device such as a computer or a smart phone, or to the coordinate measuring machine, via a communication network. For example, when the error determination apparatus 10 is formed by an information device such as a computer or a smart phone, the output part 125 displays the measurement error C1 and the decision result C2 on a display included in the information device.

By outputting or displaying the measurement error C1 and the decision result C2 in this way, the user of the coordinate measuring machine can know the measurement error that occurs when a workpiece is measured using the coordinate measuring machine and determine the reliability of the coordinate measuring machine, for example. Specifically, the user of the coordinate measuring machine can decide whether or not to repair the coordinate measuring machine on the basis of the result of determining the measurement error that occurs when the workpiece is measured.

<A Flowchart of the Error Determination Apparatus 10>

Figure 4:
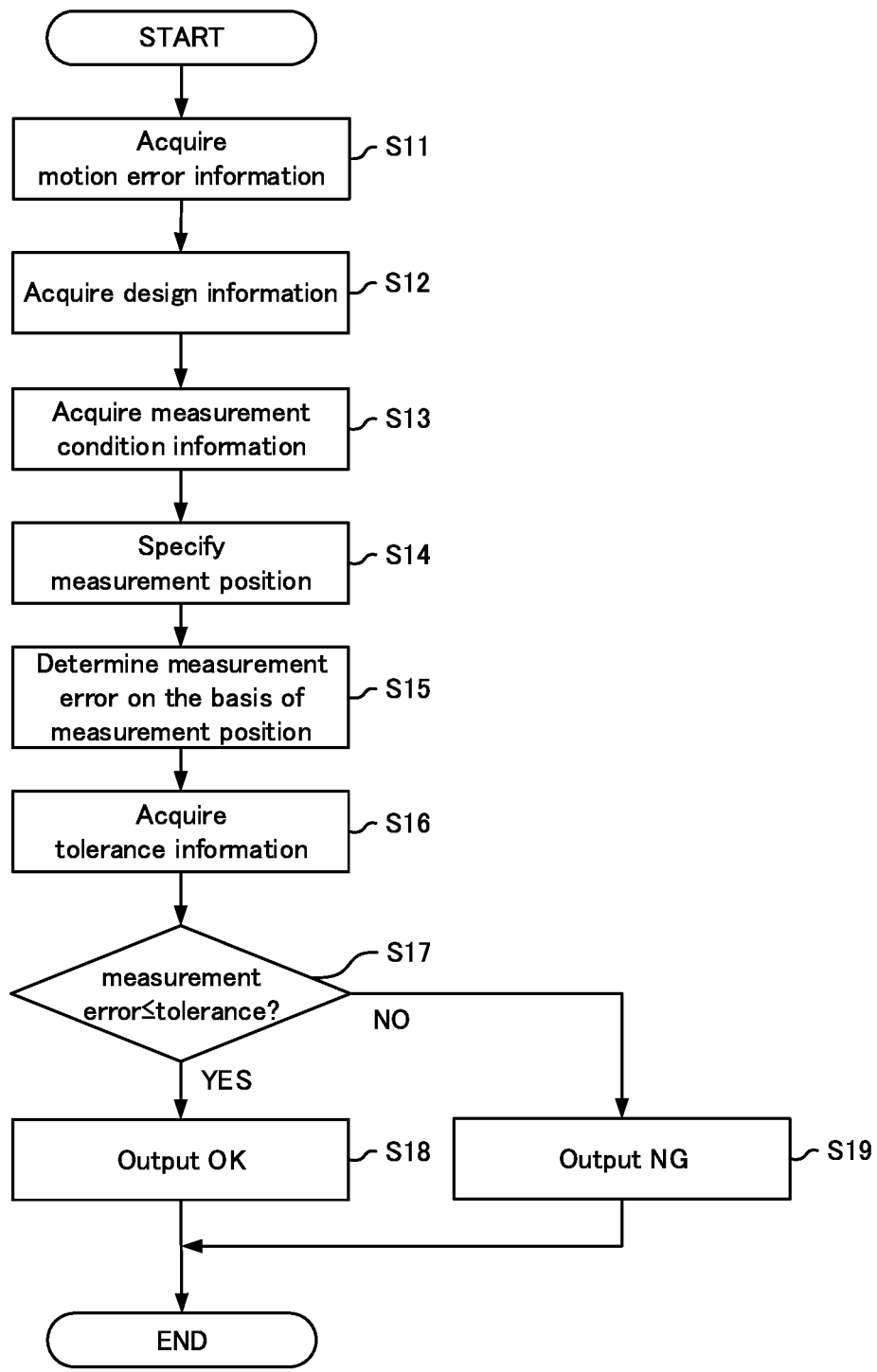
FIG. 4 is a flowchart for explaining an operation of the error determination apparatus 10.

FIG. 4 is a flowchart for explaining an operation of the error determination apparatus 10. The information acquisition part 121 acquires the motion error information B1 (step S11). The information acquisition part 121 acquires the design information B2 (step S12). The information acquisition part 121 acquires the measurement condition information B3 (step S13). The measurement position specification part 122 specifies the measurement position on the basis of the design information B2 (step S14). The error determination part 123 determines the measurement error C1 on the basis of the measurement position specified by the measurement position specification part 122 (step S15).

The information acquisition part 121 acquires the tolerance information B4 (step S16). When the error determination part 123 determines the measurement error C1, the decision part 124 compares the tolerance indicated by the tolerance information B4 to the measurement error C1. If each of the plurality of motion errors indicated by the measurement error C1 is equal to or less than the tolerance respectively corresponding to the motion errors (YES in S17), the decision part 124 decides that the measurement error C1 is in the acceptable range, and outputs "OK" as the decision result (step S18). If one or more motion errors of the plurality of motion errors indicated by the measurement error C1 exceed the tolerances corresponding to the motion errors (NO in S17), the decision part 124 decides that the measurement error C1 is not in the acceptable range, and outputs "NG" as the decision result (step S19).

<Effects of the Error Determination Apparatus 10>

As described above, the error determination apparatus 10 includes the measurement position specification part 122 that specifies the measurement position of the workpiece on the basis of the design information. Then, the error determination part 123 determines the measurement error that occurs in the measurement at the measurement position specified by the measurement position specification part 122 on the basis of the motion error information. The error determination apparatus 10 operates in this manner, and so the error determination apparatus 10 can determine the measurement error in the coordinate measuring machine while taking into account the motion error that changes depending on the measurement position on the workpiece. Then, the user of the coordinate measuring machine can determine the reliability of the coordinate measuring machine on the basis of the measurement error determined by the error determination apparatus 10. As a result, the user who measures the workpiece using the coordinate measuring machine can a) confirm whether or not the coordinate measuring machine can appropriately measure the workpiece prior to the measurement and b) appropriately determine whether or not the coordinate measuring machine needs to be repaired.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured to be functionally or physically distributed and integrated in arbitrary units. Further, new exemplary embodiments generated by arbitrary combinations of them are included in the exemplary embodiments of the present disclosure. The effect of the new embodiment caused by the combination has the effect of the original embodiment together.

What is claimed is:

1. An error determination apparatus for determining a measurement error that occurs when a workpiece is measured by a coordinate measuring machine, the error determination apparatus comprising:
a controller configured to:
acquire a) motion error information indicating a result of measuring a motion error due to at least one of a scale error, a translational error, or a rotational error at a time of measuring in advance in a plurality of positions in a space than can be measured by the coordinate measuring machine, b) design information of the workpiece, and c) position information indicating a location of the workpiece in the coordinate measuring machine;
specify a measurement position on the workpiece on the basis of the design information;
determine a measurement error occurring in the measurement at a contact position of a stylus included in a probe in a Cartesian coordinate system of the space that can be measured by the coordinate measuring machine and specified on the basis of the location of the workpiece and the measurement position on the workpiece on the basis of the design information due to the motion error occurring in the contact position by referencing the motion error information; and
output the determined measurement error.

2. The error determination apparatus according to claim 1, wherein
the controller is further configured to:
acquire measurement condition information indicating a plurality of measurement conditions when the workpiece is measured by the coordinate measuring machine, and
determine the measurement error further on the basis of one or more measurement conditions that affect the measurement at the measurement position among a plurality of measurement conditions indicated by the measurement condition information.

3. The error determination apparatus according to claim 2, wherein
the motion error is a rotational error;
the measurement condition information includes characteristic information indicating a length of the stylus that contacts the workpiece, and
the controller is further configured to:
determine the measurement error that occurs when the stylus contacts the measurement position by multiplying the length of the stylus by the rotational error at the contact position.

4. The error determination apparatus according to claim 1, wherein
the controller is further configured to output the determined measurement error in association with each of a plurality of positions on the workpiece.

5. The error determination apparatus according to claim 1, wherein
the controller is further configured to:
acquire tolerance information indicating a tolerance of the workpiece, and
output a result of comparing the tolerance indicated by the tolerance information and the measurement error.

6. The error determination apparatus according to claim 5 wherein the controller is further configured to:
determine that the measurement error is not in an acceptable range if the measurement error exceeds the tolerance of the workpiece, and determine that the measurement error is in the acceptable range if the measurement error is equal to or less than the tolerance of the workpiece, and
output a result of the determination.

7. An error determination method of determining a measurement error that occurs when a workpiece is measured by a coordinate measuring machine, performed by a computer, the method comprising:
acquiring a) motion error information indicating a result of measuring a motion error due to at least one of a scale error, a translational error, or a rotational error at a time of measuring in advance in a plurality of positions in a space that can be measured by the coordinate measuring machine, b) design information of the workpiece, and c) position information indicating a location of the workpiece in the coordinate measuring machine;

determining a measurement position on the workpiece on the basis of the design information;

determining a measurement error occurring in the measurement at a contact position of a stylus included in a probe in a Cartesian coordinate system of the space that can be measured by the coordinate measuring machine and specified on the basis of the location of the workpiece and the measurement position due to the motion error occurring in the contact position by referencing the motion error information; and outputting the determined measurement error.

8. A non-transitory recording medium storing a program for causing a computer to determine a measurement error that occurs when a workpiece is measured by a coordinate measuring machine, the program causing the computer to implement functions comprising:

acquiring a) motion error information indicating a result of measuring a motion error due to at least one of a scale error, a translational error, or a rotational error at a time of measuring in advance in a plurality of positions in a space that can be measured by the coordinate measuring machine, b) design information of the workpiece, and c) position information indicating a location of the workpiece in the coordinate measuring machine;

determining a measurement position on the workpiece on the basis of the design information;

determining a measurement error occurring in the measurement at a contact position of a stylus included in a probe in a Cartesian coordinate system of the space that can be measured by the coordinate measuring machine and specified on the basis of the location of the workpiece and the measurement position, due to the motion error occurring in the contact position by referencing the motion error information; and outputting the determined measurement error.

* * * * *